June 23, 1936.  N. STERN  2,045,058

GRINDING MILL

Filed June 25, 1934

Inventor
Nathan Stern,
By Sommers & Young
Attorneys

Patented June 23, 1936

2,045,058

UNITED STATES PATENT OFFICE 2,045,058

GRINDING MILL

Nathan Stern, Frankfort-on-the-Main, Germany, assignor to Alfred Teves Maschinen- und Armaturen Fabrik G. m. b. H., Frankfort-on-the-Main, Germany Application June 25, 1934, Serial No. 732,310
In Germany November 10, 1933

8 Claims. (Cl. 83—18)

This invention relates to improvements in grinding mills and driving means therefor and particularly to small mills for domestic use, such as coffee grinding mills.

In the present constructions of small mills, such as are used in the home for grinding coffee and the like, rotary grinding elements having a rotational velocity generally not over about 800 R. P. M. are employed. To attain this low speed from ordinary rotary electric motors, it is necessary to employ a reducing transmission between the motor and the grinding cone. This transmission drive, which can also take the form of a check device, is used in all known embodiments of electrically driven mills. The motors and gears of these known machines are necessarily provided with bearings and the like having friction and hence subject to wear and requiring more or less frequent lubrication and other service. The use of such mechanism naturally complicates the drive, thus increasing the cost and reducing the life of the small mill.

An object of this invention is to provide an electrically driven mill which is materially simplified compared to previously-known devices.

A further object of this invention is to provide an electrically driven mill free of elements in frictional contact, and in which the usual high speed rotary motor is eliminated.

Another object of this invention is to eliminate the necessity of a reducing mechanism between the driving element and grinding element.

A further object of this invention is to provide a mill in which the grinding element is driven directly from a reciprocatory driving element at the proper speed for the grinding operation.

A still further object of this invention is to provide a mill of simple construction and capable of ready regulation and adjustment of the fineness of grinding even while in operation.

Another object of this invention is to provide a grinding mill in which the grinding element and its driving element are reciprocatory and driven by an alternating electromagnetic field, the grinding and driving elements being resiliently mounted and having an oscillatory frequency substantially similar to that of the alternating electromagnetic field.

Figure 1:
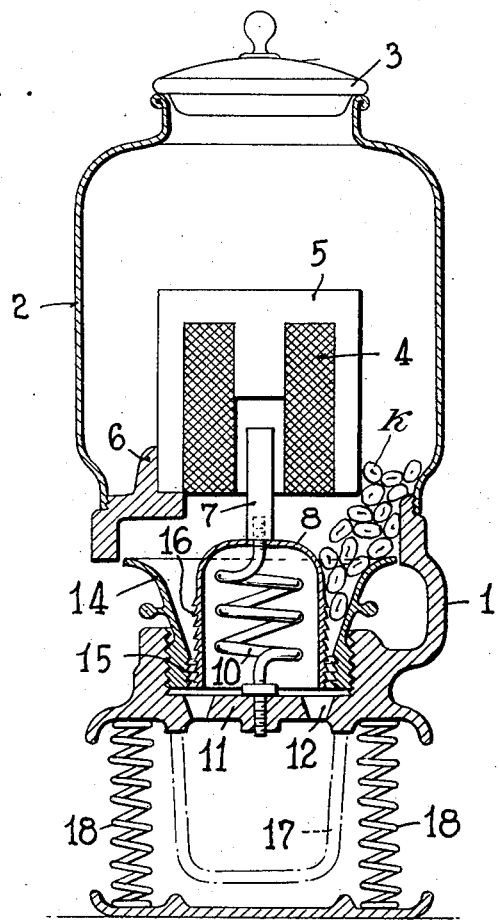
Figure 2:
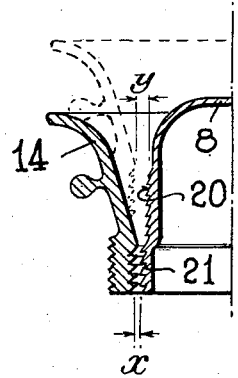
Figure 3:
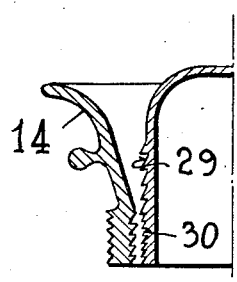

Further objects and advantages of this invention will be apparent from the detailed description of the accompanying drawing illustrating the invention:

In the drawing, Fig. 1 is a vertical sectional view of the mill and its driving means;

Fig. 2 is an enlarged cross-sectional view of part of one form of the grinding elements illustrating adjustability thereof for different fineness of grinding; and Fig. 3 is an enlarged cross-sectional view of another form of grinding elements.

The mill, as shown, comprises a housing or frame 1, having a receptacle 2 for the coffee or the like to be ground mounted thereon. The receptacle is preferably provided with a filling opening 3 having a cover. An electromagnetic coil 4 having a core 5 is mounted inside the frame 1, on one or more brackets 6 and is connected with a source of alternating current whereby an alternating electromagnetic field is provided.

The core 5 extends from inside one end of the coil across the end of the coil and along the sides toward the opposite end and serves to concentrate stray currents or lines of force. At one end the coil is hollow and an armature 7 is adapted to pass therein. The armature is attached to a bell-shaped grinder element 8 of hollow, light weight construction and these two parts are supported in the casing 1 by a coil spring 10 adjustably mounted at one end on a spider 11 in an opening 12 of casing 1 and extending within the hollow of grinder element 8 which is open at its lower end and is attached therein at a point opposite the armature 7. The grinder element 8, armature 7 and spring 10 form together an oscillatory unit and are tuned to substantially the frequency of the electromagnetic field. For cooperation with grinder element 8 an outer grinder element 14 is adjustably mounted in frame 1 around element 8 and having its lower end above opening 12 of the frame 1. This outer grinding element is funnel-shaped at its upper portion to guide the material to the grinding surfaces. The lower part of outer grinding element 14 is substantially cylindrical and on its inner surface is provided with annular serrations or teeth 15 for cooperation with corresponding teeth 16 on the external surface of grinding element 8. A collecting pan 17 is provided underneath opening 12 for catching the ground material. The whole machine, including the frame 1, receptacle 2, grinding elements 8 and 14, and collecting pan 17, is preferably resiliently mounted on coil springs 18.

In the enlarged view of the grinding elements shown in Fig. 2 it may be seen that the inner grinding element 8 is graduated in diameter becoming larger downwardly. The outside grinding element 14 is screw-threadedly secured in frame 1 whereby its vertical position relative to element 8 may be adjusted. It is thus possible to move the outer element 14 vertically so that its grinding teeth will be opposite either the smaller portion 20 or a larger portion 21 of the inner element 8. The two sets of lines x and y indicate the space between the grinding teeth in these two positions of adjustment and it is clear that when element 14 is in its upper position as indicated in dotted lines, the space between the grinding elements is larger and the material ground would consequently be larger or coarser. Any desired number of graduations of the size of the grinding element 8 may be provided depending on the number of sizes of material it may be desired to produce.

The fineness of grinding may also be controlled by other means, such as providing different sizes or form of teeth on various parts of grinding element 14, for instance, finer teeth on the lower part, in which case the grinding could be varied by moving element 14 even though element 8 is of constant diameter. Fig. 3 illustrates such an arrangement, the construction and operation being similar to Figs. 1 and 2 except that the diameter of the grinding surfaces of inner grinding element 28 is constant and the upper portion of said element is provided with coarse grinding teeth or serrations 29 while the lower portion is provided with finer teeth or serrations 30. The size of the material ground depends upon whether the outer grinding element 14 is adjusted to position for cooperation with the coarse or fine teeth of element 28.

The mass of the armature 7 and grinding element 8 and the strength or resilience of spring 10 on the one hand and the total mass of the machine and strength or resilience of springs 18 on the other hand are predetermined so that two oscillatory units are formed, each having a natural frequency substantially tuned to the frequency of the driving alternating current, but oscillating oppositely to each other, that is, in opposite phase, the magnitude of oscillation of the smaller unit being greater than the larger unit inversely as their masses.

In order to control the amplitude of the oscillations of both units, the tuning of their frequency is adjusted so as to be slightly out of true resonance with the frequency of the driving force.

When the two units have been brought to the desired tune or inherent oscillatory frequency, no further adjustment of either is permissible without throwing the other out of adjustment as the two units are interconnected resiliently through spring 10, and the masses of the two units bear a particular relationship when properly tuned.

The mill as a whole may be mounted on any suitable base, such as on a table or wall, but since the machine as a whole performs oscillations, it must be mounted resiliently.

The mill according to this invention is of exceedingly simple construction, thereby simplifying the trouble of keeping it in good working order. All frictional contact of moving parts is entirely eliminated, as the machine contains no high speed bearings such as have heretofore been commonly used, and also no reducing gears are required. The elimination of these parts also eliminates the necessity for periodically lubricating them and other such service.

I claim:

1. In an electrically driven grinding mill, a frame, spring means supporting said frame, an electromagnet fixedly mounted on said frame, a funnel-shaped grinding element adjustably mounted in said frame, a rectilinearly oscillatory grinding element resiliently mounted in said frame in cooperation with the funnel-shaped grinding element, an armature attached to said rectilinearly oscillatory grinding element in position to be influenced by the electromagnet, and a source of alternating current for energizing said magnet, the rectilinearly oscillatory grinding element and armature and the spring supported frame, funnel-shaped grinding element and electromagnet constituting a pair of oppositely acting units having their frequencies tuned to substantial resonance with the actuating current.

2. In an electrically driven grinding mill, a pair of coacting reciprocable grinding elements, a spring supporting one of said elements, a second spring supporting the other grinding element on the first element, an electromagnet secured to one of said grinding elements, an armature secured on the other element, a source of alternating current connected with the electromagnet, the strengths of said springs and weights of the members supported thereby being correlated to the frequency of the current so as to reciprocate in substantial resonance therewith.

3. In an electrically driven grinding mill, a pair of coacting rectilinearly reciprocable grinding elements, a spring supporting one of said elements, a second spring supporting the other grinding element on the first element, an electromagnet secured to one of said grinding elements, an armature secured on the other element, a source of alternating current connected with the electromagnet, the strengths of said springs and weights of the members supported thereby being correlated to the frequency of the current so as to reciprocate oppositely in substantial resonance therewith.

4. In an electrically driven grinding mill, a pair of coacting reciprocable grinding elements, a spring supporting one of said elements, a second spring supporting the other grinding element on the first element, an electromagnet secured to one of said grinding elements, an armature secured on the other element, a source of alternating current connected with the electromagnet, the strengths of said springs and weights of the members supported thereby being correlated to provide for oscillation slightly out of full resonance with the frequency of the current to control the amplitude of the oscillations of said grinding elements.

5. In an electrically driven grinding mill, a pair of coacting reciprocable grinding elements, a spring supporting one of said elements, a second spring supporting the other grinding element on the first element, one of said grinding members being hollow and bell-shaped, an electromagnet secured to one of said grinding elements, an armature secured on the other element, a source of alternating current connected with the electromagnet, an adjustable hopper encompassing the bell-shaped grinding member and connected with the other grinding member, the strengths of said springs and weights of the members supported thereby being correlated to the frequency of the current so as to reciprocate in substantial resonance therewith.

6. In an electrically driven grinding mill, a pair of coacting reciprocable grinding elements, a spring supporting one of said elements, a second spring supporting the other grinding element on the first element, one of said grinding elements having a cylindrical portion provided with grinding teeth of one size along part of its axial extent and teeth of a different size along another part of its axial extent, means for adjusting the other grinding element axially with respect to the teeth of the first element, an electromagnet secured to one of said grinding elements, an armature secured on the other element, a source of alternating current connected with the electromagnet, the strengths of said springs and weights of the members supported thereby being correlated to the frequency of the current so as to reciprocate in substantial resonance therewith.

7. In an electrically driven grinding mill, a pair of coacting reciprocable grinding elements, a spring supporting one of said elements, a second spring supporting the other grinding element on the first element, one of said grinding elements having a cylindrical portion provided with grinding teeth of one size along part of its axial extent and teeth of a different size along another part of its axial extent the other grinding element having a cylindrical portion provided with grinding teeth, means for adjusting one of said elements axially with respect to the other to selectively bring the different sets of teeth into grinding relation, said adjustment means being accessible from the outside of the mill during operation, one of the grinding elements having a hopper shaped portion for feeding the material to be ground between the teeth, an electromagnet secured to one of said grinding elements, an armature secured on the other element, a source of alternating current connected with the electromagnet, the strengths of said springs and weights of the members supported thereby being correlated to the frequency of the current so as to reciprocate in substantial resonance therewith.

8. In an electrically driven grinding mill, a main frame, a base, a spring supporting the frame with respect to the base, a grinding element adjustably mounted in said frame, a second grinding element of hollow form, a spring supporting the second grinding element with respect to the frame and extending within the hollow of said second element, an electromagnet secured to one of said grinding elements, an armature secured on the other element, a source of alternating current connected with the electromagnet, the strengths of said springs and weights of the members supported thereby being correlated to the frequency of the current so as to reciprocate in substantial resonance therewith.

NATHAN STERN.